March 19, 1935.　　J. M. HALBING ET AL　　1,994,700
WELDING APPARATUS
Filed Nov. 23, 1931　　3 Sheets-Sheet 1
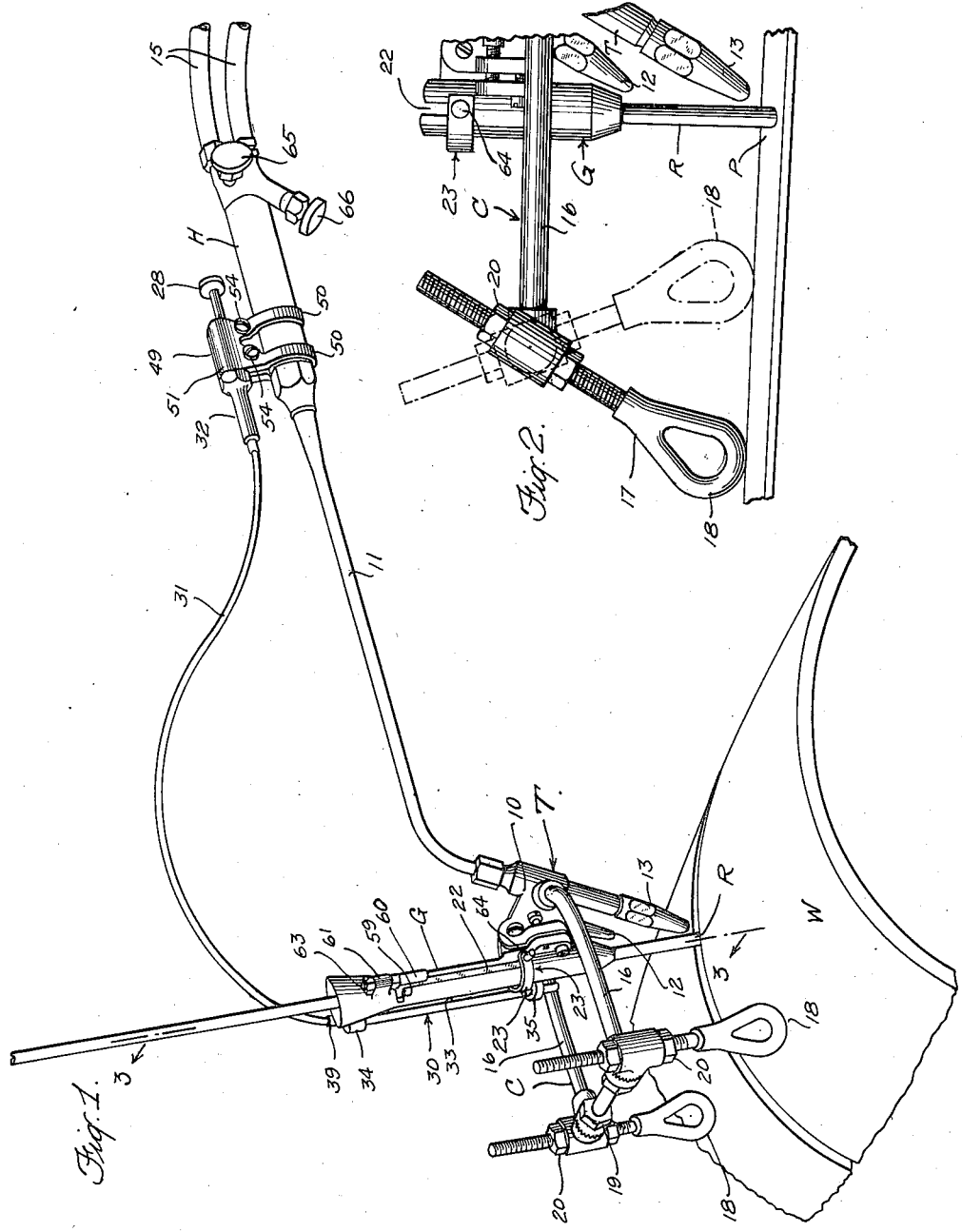
INVENTORS:
John M. Halbing,
Robert J. Kehl,
BY　ATTORNEYS
Byrnes Townsend & Potter.

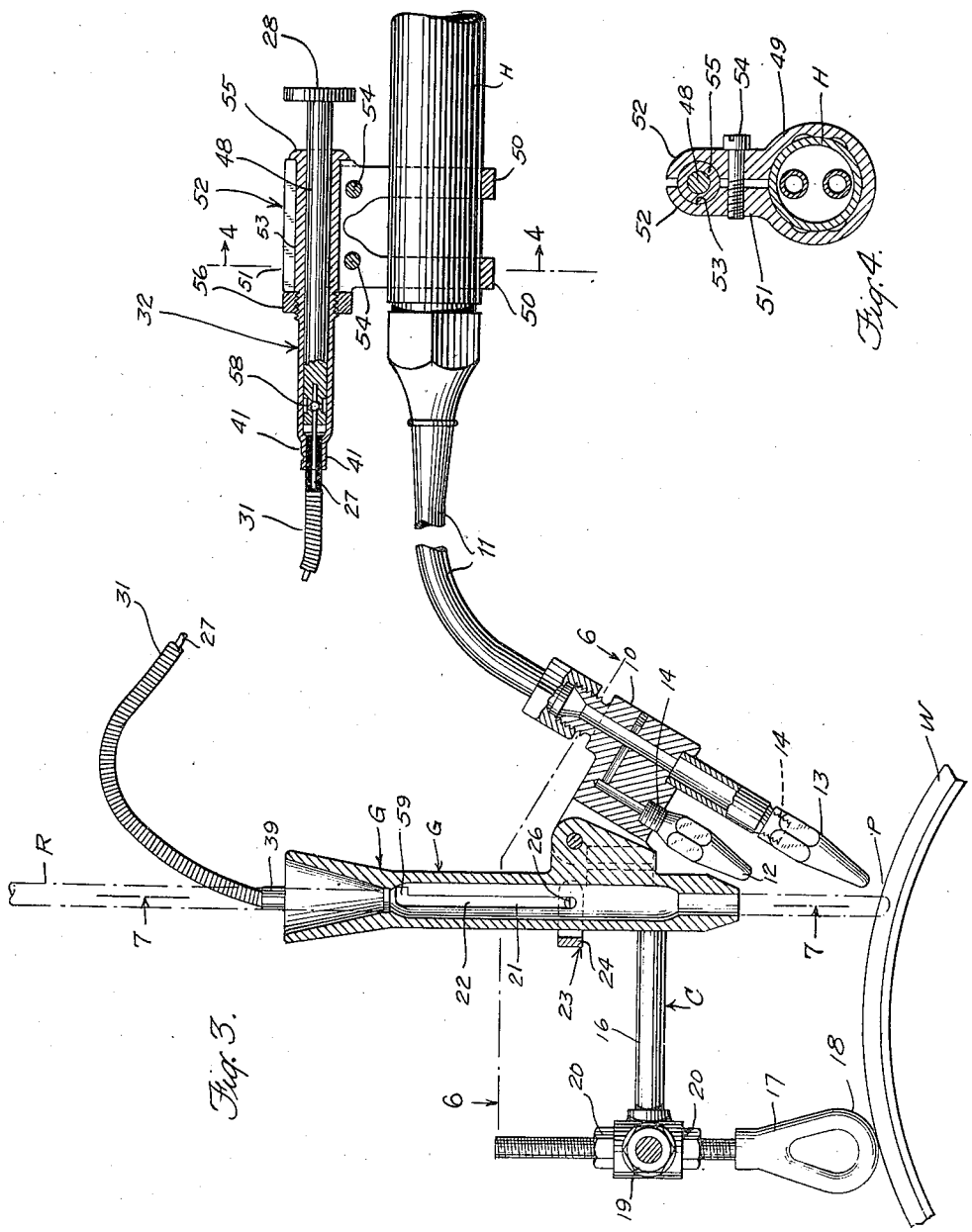

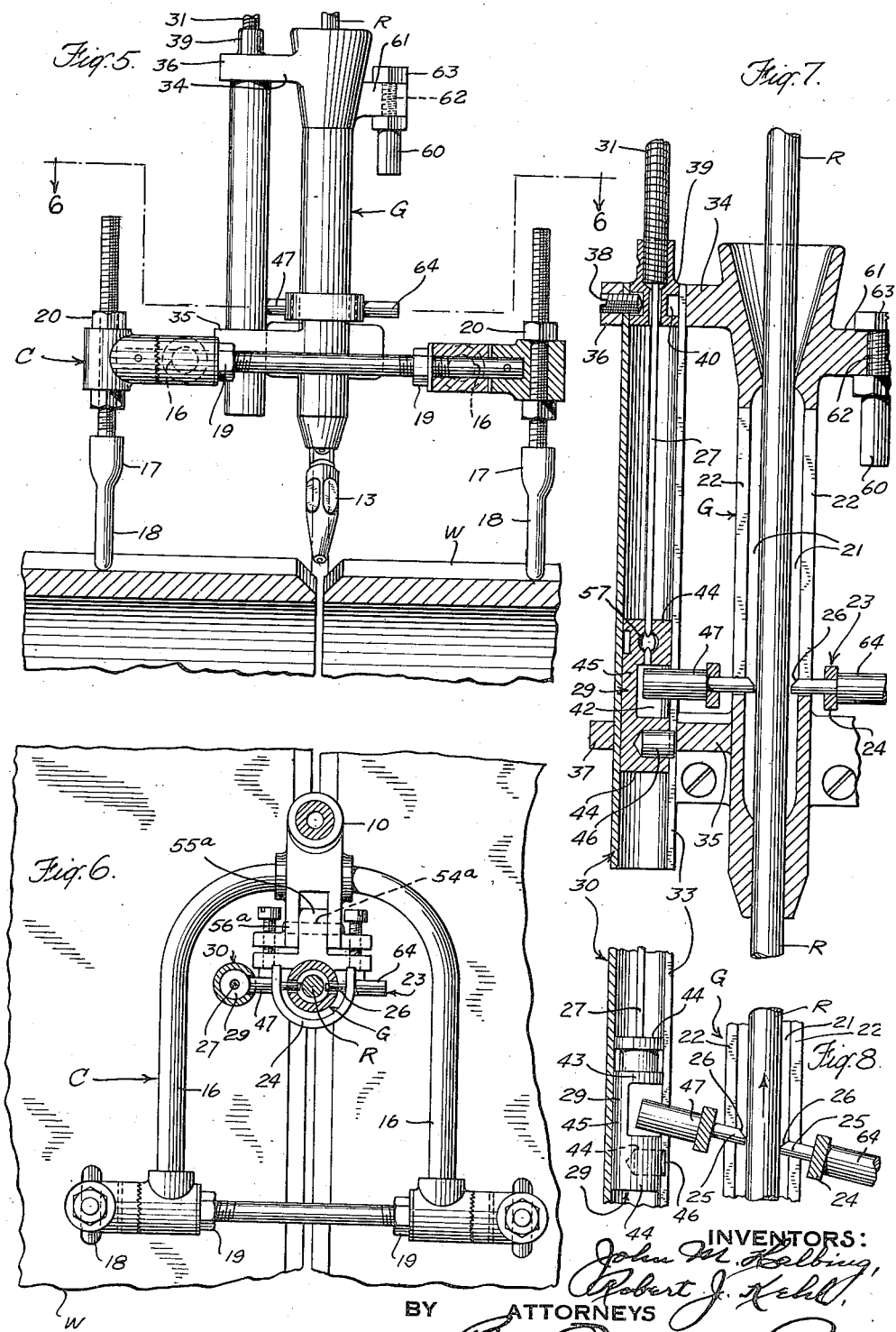

Patented Mar. 19, 1935

1,994,700

UNITED STATES PATENT OFFICE 1,994,700

WELDING APPARATUS

John M. Halbing, Bloomfield, N. J., and Robert J. Kehl, Bayside, N. Y., assignors to The Linde Air Products Company, a corporation of Ohio Application November 23, 1931, Serial No. 576,893

22 Claims. (Cl. 113—59)

The present invention relates to welding apparatus adapted for use in hand welding and of a character similar to and an improvement upon the welding apparatus disclosed in the copending application of M. J. Wall, Ser. No. 552,467, filed July 22, 1931.

Apparatus of this character, as heretofore known, has been provided with a heating unit for producing welding heat at a welding point and a rod guide for directing a welding rod to such point, which, with other related accessories, have been mounted upon a suitable carriage having runners or the like for supporting the same on work. The rod guide is of tubular form with the bore therethrough sufficiently greater in diameter than the rods to be used therewith that the rods will be fed thereby to the welding point by gravity.

With apparatus of this character it has been necessary for the welder, when the weld approaches a tack or where, for any reason, it is desired to remove the rod from the influence of the welding heat, to reach over and lift the rod with his hand and to hold it raised, while playing the flame on the tack or other surface requiring special preheating to bring it to welding condition. Such operations are quite fatiguing and expose the welder's hand uncomfortably to the welding heat besides tending to distract his attention from the weld being formed. Further, with such apparatus, when the rod becomes too short to be grasped by the welder, such lengths must be discarded when conditions of the above character necessitating the discontinuance of melting the rod are encountered.

An object of the invention is therefore to provide improved welding apparatus adaptable to various conditions of work and to various contours of work surfaces, by use of which, hand welding may be more simply and more rapidly performed with less fatigue and discomfort to the welder than has been possible with apparatus heretofore known.

More specifically, an object of the invention is to provide, in welding apparatus having a heating unit and a guide for directing a welding rod to the welding point, improved mechanism whereby the position of the rod in the guide may be changed at will by a simple movement of the welder's hand and without subjecting him to discomfort from the welding heat, and whereby the position of a rod, too short to be grasped by the welder's hand, may be changed in the guide.

In accordance with the present invention, the welding apparatus may be comprised of an oxyacetylene torch having the usual welding head with welding tips attached thereto and a handle connected with the welding head by a stem of such length that the handle will lie beyond the zone of intense heat influence of the torch. Associated with the torch, there is provided a welding rod guide tubular in form and adapted to guide a welding rod to the welding point as in previously known apparatus. This apparatus is, preferably mounted on a carriage which is supported on runners adjustably connected thereto and positioned rearwardly of the welding point and so as to rest on both sides of a seam being welded thereby.

In addition to the above, the present apparatus further provides in association with the rod guide, means, as a clamp, movable axially of its bore and adapted to grip the rod for raising and lowering it in said bore, and which, when moved to a point along its course, as to its lower limit, acts automatically to permit the rod to feed freely by gravity to the welding point. The clamp is operably connected with suitable actuating mechanism extending to a point outside of the zone of intense heat influence and in convenient position and of a construction to be operable with little effort by the welder. This actuating mechanism may be in the nature of a Bourdon control, the pull button of which may be mounted upon the handle of the torch, out of the zone of intense heat from the welding torch, and in convenient position for operation by the welder. The construction of the rod guide and clamp are preferably such and are so related that the clamp grips the portion of the rod within the bore of the guide whereby shorter length of rod may be manipulated within the rod guide than could be grasped by the hand of the welder. The clamping device and manipulating mechanism are also, preferably of a character to frictionally hold the rod in any position in the tube to which it may be moved.

The above and further objects, advantages and novel features of the invention will be more fully disclosed in the following specification taken with the accompanying drawings, in which, Fig. 1 is a perspective view of an apparatus embodying the principles of this invention and showing the same as used in welding a girth seam between curved surfaces of considerable diameter;

Fig. 2 is a fragmentary view on an enlarged scale compared with Fig. 1 showing angular adjustment of the runners for different work conditions;

Fig. 3 is a view in vertical section in the plane of the weld with the welding rod shown dotted to better illustrate structural features of the rod guide;

Fig. 4 is a detail cross sectional view through the clamp for securing the control to the handle;

Fig. 5 is a rear view of the apparatus parts being shown in section;

Fig. 6 is a sectional view through the rod guide at right angles to Fig. 3 on line 6—6 of Fig. 3 the carriage being shown in plan;

Fig. 7 is a further enlarged sectional view taken vertically through the rod and plunger guide at right angles to Fig. 3 on the line 7—7 of Fig. 3; the carriages and handle being broken away and showing the yoke in rod releasing position;

Fig. 8 is a fragmentary detail view of the section shown in Fig. 7 showing the yoke in rod gripping position.

The embodiment of the invention as disclosed in the above figures is particularly adapted for back hand welding although it is to be clearly understood that part or all of the novel features thereof may be applied to advantage to other forms of hand operated or machine operated welding apparatus. The apparatus as disclosed comprises a torch T for supplying the welding heat, a guide tube G for feeding a welding rod R to the welding point P; a handle H connected to the torch in spaced relation thereto; and a carriage C adapted to be suitably supported on the work W being operated upon.

The torch may be of any usual construction and, as shown, comprises a welding head 10 connected in spaced relation to the handle H by a tubular stem 11, the head being positioned at an angle to the stem 11 so as to extend downward therefrom when the stem is held in a horizontal or substantially horizontal position. The head is provided with tips 12 and 13 for directing heating flames respectively upon the rod R at the welding point P and at a point higher up along the rod for preheating the latter. These tips may be detachably secured to the head as by threaded connections at 14, so as to be interchangeable with other tips for use with different work conditions, as different sizes of welding rods or different thicknesses of members to be welded together. The stem 11 may serve as a conduit for the gases of combustion between suitable flexible connections 15 leading from a source of supply (not shown) to the welding head.

The carriage C comprises slightly resilient arms 16 attached to and extending a suitable distance rearwardly of the torch T and guide tube G; the said carriage being supported by supports 17 secured to the arms 16 and projecting downwardly therefrom; the supports including suitable runners 18 rounded on their lower surfaces to rockably rest on the work and support the major portion of the weight of the welding apparatus. The supports 17 are shown to be two in number, although a single support or more than two supports may be, under certain conditions, effectively used. These supports, as shown, are laterally spaced with respect to the line of travel of the torch in welding and so as to rest on either side of the line thereby tending to prevent lateral deviation of the torch from the seam being formed, and these supports may be angularly and axially adjustable relative to the carriage to adapt the apparatus to various contours of work surface, and the supports may be suitably held in positions of angular adjustment by nuts 19 and in positions of axial adjustment by lock nuts 20.

The welding rod R is normally fed by gravity through the bore of the guide tube G and rests with its lower end in the V of the seam between the members being welded together while the welding heat is being played thereon and on the adjacent sides and bottom of the seam forwardly thereof by the tips 12 and 13.

In order to eliminate the fatigue and exposure of the welder's hand to the welding heat, in raising and lowering the welding rod in its guide tube and in order to eliminate waste in welding rod material in the manner and for the reasons hereinbefore set forth, a suitable construction of the guide tube is provided in accordance with the present invention, together with suitable accessories cooperating therewith which will presently be described.

The construction of the present guide tube G is similar, in the main, to that described in the above-mentioned Wall application, having a bore 21 therethrough of sufficiently greater diameter than the rod to be used therewith to permit the rod to readily pass therethrough under force of gravity. The bore is also, as in the Wall device, slightly enlarged in diameter intermediately of its ends to prevent binding of a warped or otherwise irregularly formed rod placed therein.

The guide tube in the present construction, however, is further provided with diametrically opposing slots 22 extending lengthwise of the bore of the tube and communicating therewith. Associated with the rod guide is a clamping device 23 slidable longitudinally thereof and comprising a semi-circular yoke member 24 of slightly greater span than the diameter of the rod guide tube and provided with clamping lugs 25 extending radially through slots 22 of the rod guide to grip a rod within the tube therebetween. The free ends of these lugs may be beveled as shown at 26 to enable them to bite into the rod to better advantage and the lugs are preferably positioned in diametrically opposite relation with their inner ends spaced a distance apart slightly greater than the diameter of the rod to be used with the given size of rod guide with which the clamp is associated. As a consequence, when the yoke is in position for the lugs to extend at right angles to the axis of the bore 21, the rod will be free to feed through the bore by gravity. On the other hand, when the yoke is tilted from this angle, the lugs will approach and bite into the rod and the rod may then be raised and lowered with the clamp as desired. The tilting of the yoke is rendered possible by the fact that its spread is greater than the diameter of the guide as set forth above and the automatic disengagement of the lugs from the rod is provided for by forming the slots 22 with their lower ends closed and in radial alignment at right angles to the axis of the bore 21. By this construction when the lugs of the clamp abut against these lower ends they will be brought into alignment at right angles to the axis of the bore and the rod will then be released and fed by gravity.

Suitable mechanism is also provided for raising and lowering the clamp operable from the handle H and out of range of the welding heat. In the present embodiment, this mechanism comprises a Bourdon control consisting of a flexible wire 27 connected between a pull button mechanism 28 and a plunger 29; the latter being mounted to slide in parallelism with the axis of the rod guide bore 21 as within the bore of a tubular plunger guide 30. The flexible wire is encased in the flexible tubing 31 usual in such devices which is anchored at its respective ends in the upper end of the guide tube 30 and in the end of a housing 32 for the pull button mechanism shown as secured to the handle H.

The plunger guide tube 30 is provided with a slot 33 extending the entire length thereof and arranged in opposition to one of the slots 22 in the rod guide and the tube is held in parallelism with the rod guide by brackets 34 and 35. These brackets are mounted to extend in spaced relation to each other respectively from points near the upper and lower ends of the rod guide, are formed integral therewith and are provided with annular members 36 and 37 adapted to receive the plunger guide tube 30 snugly therein. A set screw 38 in threaded through aligned apertures in the annular member 36 and the guide tube to hold the latter in its proper position with respect to the rod guide. This set screw also serves to anchor the end of the flexible tubing 31 in the upper end of the plunger guide; said tubing having a plug 39 fitting in the end of the guide tube which is provided with a peripheral groove 40 for reception of the end of the screw shank. The other end of the tubing 31 is secured to the pull button housing 32 by reducing the end of the housing as shown at 41, so as to grip the tubing in its correspondingly reduced bore.

The plunger 29 comprises a member intermediately cut away to provide a recess 42 between two heads 43 and 44 which latter are connected by a tie portion 45 lying at the side of the guide tube opposite the slot 33. The heads 43 and 44 snugly fit the bore of the tube 30 and one of the heads, as shown, the lower head 44 is provided with a lug 46 extending into the slot 33 to prevent turning movement of the plunger in the tube.

The recess 42 is designed to receive the end of a finger 47 extending radially from the yoke 24 loosely therein; the finger constituting in the present embodiment, a continuation of one of the lugs 25. The loose connection between the yoke and the plunger provides a flexibility between these two members whereby the clamp is free to tilt into position for gripping the rod when the clamp is moved upward by the plunger.

While other forms of clamps may be used in substitution for that just described, the present form has special adaptability to the purpose at hand, in that its construction is simple and lends itself to automatic release of the rod when brought to a position at right angles thereto as hereinbefore set forth.

The pull button 28 is provided with a shank 48 to which the wire 27 is attached and the shank 48 is slidable within the housing a distance equal to the desired movement of the plunger 29 in the guide tube.

Sufficient friction is provided between certain elements of the control for the clamp 23, as between the wire 27 and the flexible tubing 31 and between the shank 48 and the housing 32, to insure the plunger 29 being held thereby at any position to which it may be moved by operation of the pull button 28; which friction should be so adjusted as to accomplish this desired purpose without rendering the control mechanism difficult of operation.

In order to avoid disconnection of the wire 27 from the plunger 29 or the shank 48 in manipulation of a rod by the control mechanism, as by relative turning movement between the wire and either of these parts, and to avoid any other damage to the parts due to such relative turning movement, the wire is preferably swiveled to these parts respectively at 57 and 58.

While other known means may be incorporated in the present apparatus for manipulating the clutch, the present organization including the flexible wire is especially suitable thereto, in that it is rugged in its character, adapting it to stand up under the rough usage of field work; it lends itself to ready repair; and, what is of especial importance, readily accommodates itself to adjustments between the rod guide and torch.

The housing 32 is suitably secured to the handle H as by a clamp 49 of suitable character. The clamp, as shown, comprises a pair of annular split bands 50 having radial extensions 51 at the ends of the annuli connected in pairs by clamping members 52 lying in parallelism and each having semi-cylindrical grooves 53 extending in parallelism with the handle H and lying in opposition to each other for reception of the housing 32 therein. The radial extensions 51 serving to support the clamping members are sufficiently resilient to permit the clamping members to be drawn together by suitable means as screw bolts 54 to clamp the housing 32 between the members 52. Integrally formed with the housing 38 at one end thereof, is a flange 55 adapted to rest against one end of the members 52 and the housing has threaded thereto intermediately of its ends a nut 56 adapted to abut the other end of the members 52 and together with the flange 55 hold the housing against axial movement in the grooves 53.

The rod guide G is detachably secured to carriage C through the welding head 10 to which it is pivotally connected by a bolt 54ª extending through interengaging ears 55ª and 56ª respectively on the guide tube and torch head. By this arrangement the torch and rod guide may be disconnected and the rod guide replaced by another of different cross section for accommodation of similarly varying welding rods.

The opposing slots 22 in the rod guide G are provided at their upper ends with laterally offset recesses 59 extending in parallelism and adapted to permit disengagement of the lugs 25 on the clamp 23 from the slots. The clamp is normally prevented, however, from disengagement from the slots by a stop 60 removably supported by an arm 61 which extends laterally from the guide tube G; the stop being positioned to extend below the offset recesses 59 in parallelism with one of the slots 22. The stop 60 is detachably connected with the arm 61 by a reduced stem 62 formed on the stop and threaded to engage with the threads of an aperture in the arm; accidental disengagement between these members being prevented by a lock nut 63. The stop 60 cooperates in its limiting function with a finger 64 formed on the clamp and extending radially therefrom and preferably constituting a continuation of one of the lugs 25.

The feed of the gases to the welding heat is controlled by the usual valves 65 and 66 located conveniently for operation on the handle H.

In operation, the torch is ordinarily drawn along the surfaces of the members to be welded together in a back hand welding movement, which is to say, the torch apparatus is drawn toward the welder with the flame directed rearwardly toward the finished weld, the only other manipulation of the apparatus ordinarily being a slight raising and lowering of the torch for control of the puddle formed at the welding point.

When, however, a tack is approached or other conditions arise in which it is desirable to raise the welding rod to prevent metal being flown therefrom into the seam, instead of the welder having to reach over to raise the rod with his hand, as in heretofore known devices, he may accomplish this end by simply drawing the pull button 28 rearwardly. Upon so doing, the plunger 29 will be raised in the guide tube 30 tilting the clamp 23 in its initial movement, whereupon, the lugs 25 will grip the rod R drawing it upwardly therewith out of range of the welding heat. The clamp will be held by friction between the pull button shank 48 and its housing 32 and between the wire 27 and the flexible tubing 31 in any position to which it is moved in the manner as set forth above, and by this arrangement, thereby relieving the welder of further attention thereto until it is desired to again lower the rod into the welding heat which operation is, of course, the reverse of that in raising the rod. Both of these operations are accomplished without a change of the welder's position, and without fatigue or uncomfortable exposure to the welding heat.

From the preceding description, it is clear that in the present construction, mechanism is provided which is operable for raising and lowering a rod in the rod guide quickly and with a minimum of effort and discomfort on the part of the welder; the said means being adapted to hold the rod in any desired position under the influence of friction in which the more complete consumption of the rod may be effected and its manipulation in the rod guide accomplished after it has been melted away to a length too short to be manually grasped; and in which the rod will be automatically released by the clamping device for feeding by gravity, upon the clamp reaching its lower limit of travel. The parts of the apparatus are also made easily detachable so as to facilitate repairs or substitutions between similar parts in adapting the apparatus to differing work conditions.

We claim:

1. In welding apparatus, the combination of means for providing welding heat at a welding point; means for guiding a welding rod to the welding point; and means constructed and arranged to grip a welding rod guided by such guiding means and operable at will to retract such welding rod along such guiding means in a direction away from the welding point.

2. In a welding apparatus, the combination of heating means for providing welding heat at the welding point; means adapted to guide a welding rod to the welding point; means movable axially of the guide means and adapted to grip a rod therein; and means for moving the movable means axially of the guide means while gripping the rod.

3. In a welding apparatus, the combination of heating means for providing welding heat at the welding point; means adapted to guide a welding rod to the welding point; a handle associated with said apparatus and spaced a comparatively great distance from the welding point; and means movable relative to the guide means adapted to grip a rod therein and operable from the handle for retracting the rod in the guide means.

4. In welding apparatus, the combination of heating means for providing welding heat at the welding point; means for guiding to the welding point a welding rod adapted to be fed by force of gravity; the guide means having a bore therethrough and a slot extending lengthwise thereof in communication with the bore; gripping means slidable lengthwise of the guiding means and having a member projecting through the slot and operable at will by the welder for gripping or releasing a rod in said bore; and means for moving the rod gripping means lengthwise of the guiding means.

5. In welding apparatus, the combination of heating means for providing welding heat at the welding point and means adapted to guide a welding rod to the welding point; the guide means having a bore therethrough and opposing slots extending lengthwise of the guide means; gripping means slidable lengthwise of the guide means and having members projecting through the slots for gripping therebetween a rod in said bore; and means for moving the rod gripping means lengthwise of the guide means.

6. In welding apparatus, the combination of heating means for providing welding heat at the welding point and means adapted to guide a welding rod to the welding point; the guide means having a bore therethrough and opposing slots extending lengthwise of the guiding means; means including a yoke slidable lengthwise of the guide means and having members projecting through the slots for gripping the rod in said bore; said gripping means being ineffective to grip the rod when in one position; and means for tilting said gripping means from the first-mentioned position to cause said members to grip a rod in the bore of the guide means.

7. In welding apparatus, the combination of heating means for providing welding heat at the welding point; means adapted to guide a welding rod to the welding point; the guide means having a bore therethrough and opposing slots extending lengthwise of and communicating with said bore; a yoke of slightly greater spread than the guiding means at points opposite the slots and having lugs extending through the slots; and means connected to said yoke for moving the same lengthwise of the guide means and operative to tilt said yoke at an angle to the axis of the bore through the guide means for causing the lugs to grip the rod.

8. In welding apparatus, the combination of heating means for providing welding heat at the welding point; a rod guide for directing to the welding point a welding rod adapted to be fed by force of gravity and means for gripping a rod in the guide; said means having travel axially along the guide for moving the rod relative to the guide and being adapted to automatically release the rod upon reaching a certain point in its travel.

9. In welding apparatus, the combination of heating means for providing heat at the welding point; a rod guide for directing to the welding point a welding rod adapted to be fed by force of gravity; clamping means for gripping a rod when in said guide; said clamping means being movable with the rod relative to the guide along a path; and means along the path of movement of the clamping means for causing the same automatically to release the rod.

10. In welding apparatus, the combination of heating means for providing heat at the welding point; a rod guide for directing to the welding point a welding rod adapted to be fed by force of gravity; clamping means movable along the rod guide and tiltable when moved along the guide between a position to grip a rod in the guide and to another position to release said rod; and means at a point in the travel of the clamping means for tilting the clamping means to the rod releasing position.

11. In welding apparatus, the combination of heating means for providing welding heat at the welding point; a rod guide for directing a welding rod to said point; means including a clamp for moving a rod in said guide between lower and upper limits; and control means for raising and lowering the clamp; said clamp automatically operating to grip the rod when moved upwardly by said control means.

12. In welding apparatus, the combination of heating means for providing welding heat at the welding point; a rod guide for directing a welding rod to said point; means including a clamp for moving a rod in said guide between lower and upper limits; and control means for raising and lowering the clamp; said clamp automatically operating to grip the rod when moved upwardly by said control means and to release the rod upon reaching its lower limit.

13. In welding apparatus, the combination of heating means for providing welding heat at a welding point; a rod guide for directing a welding rod to said point; a clamp for raising and lowering the rod along said guide; a handle connected with the heating means and positioned out of range of the welding heat; and a flexible control extending between the handle and rod guide and connected with the clamp for raising and lowering the same.

14. In a welding apparatus, the combination of means to provide welding heat at the welding point, means adapted to guide to the welding point a welding rod adapted to be fed by force of gravity; and means for retracting a welding rod in the guide means to various positions in said guide means for maintaining the rod at such positions selectively at the will of an operator.

15. In welding apparatus, the combination of heating means; a guide for directing a welding rod to the welding point and adjustable relative to the heating means; a handle associated with said heating means for manipulating the same; means for shifting the position of a rod in the guide; and a flexible control for such shifting means connected to and extending between the shifting means and the handle.

16. In welding apparatus, the combination of heating means; a guide for directing a welding rod to the welding point; means for moving the rod to various positions in the guide; and a flexible control swiveled to said last named means.

17. In welding apparatus, the combination of heating means; a guide for directing a welding rod to the welding point; means for moving the rod to various positions in said guide; a control including flexible means for moving the rod to various positions in the guide; and a pull button swiveled to said flexible means and mounted for operating the same.

18. In welding apparatus, the combination of heating means for providing welding heat at a welding point; a guide for directing a welding rod to said point; control means for shifting the position of a rod in said guide; said control means including a member movable parallel to the direction of movement of the rod in the guide and a flexible member connected therewith for operating the member at a distance; and guide means for said member.

19. In welding apparatus, the combination of heating means for providing welding heat at a welding point; a tubular guide for directing a welding rod to said point; said guide having opposing longitudinal slots with oppositely directed laterally extending notches at one end; and a yoke provided with fingers extending into the bore of the guide through said slots and detachable from the guide by a turning movement through said notches.

20. In welding apparatus, the combination of heating means for providing welding heat at a welding point; a tubular guide for directing a welding rod to said point; said guide having opposing longitudinal slots with oppositely directed laterally extending notches at one end; a yoke provided with fingers extending into the bore of the guide through said slots and detachable from the guide by a turning movement through said notches; and means detachably connected to the guide to prevent undesired detachment of the yoke through said notches.

21. In welding apparatus, the combination of heating means for providing welding heat at a welding point; a guide having a bore for directing a welding rod to a welding point; and movable means extending into the bore of the guide for positively moving the rod relative to the guide in either of two opposite directions.

22. In welding apparatus, the combination of heating means for providing welding heat at a welding point; a guide having a bore for directing a welding rod to a welding point; movable means extending into the bore of the guide for positively moving the rod in either of two opposite directions; and means automatically operating for causing said movable means to release the rod when said movable means reaches a certain point in its path of movement.

JOHN M. HALBING.
ROBERT J. KEHL.